US006999384B2

(12) United States Patent
Stancil et al.

(10) Patent No.: US 6,999,384 B2
(45) Date of Patent: Feb. 14, 2006

(54) DEVICE WITH WAVEGUIDE DEFINED BY DIELECTRIC IN APERTURE OF CROSS-TRACK PORTION OF ELECTRICAL CONDUCTOR FOR WRITING DATA TO A RECORDING MEDIUM

(75) Inventors: Daniel D. Stancil, Mars, PA (US); Amit Itagi, Pittsburgh, PA (US); Tuviah E. Schlesinger, Mt. Lebanon, PA (US); James A. Bain, Pittsburgh, PA (US); Tim Rausch, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 142 days.

(21) Appl. No.: 10/256,809

(22) Filed: Sep. 27, 2002

(65) Prior Publication Data

US 2004/0062152 A1 Apr. 1, 2004

(51) Int. Cl.
*G11B 11/00* (2006.01)

(52) U.S. Cl. .................................... 369/13.32
(58) Field of Classification Search ............ 369/13.32, 369/13.05, 13.02, 13.01, 13.14, 13.16, 13.24, 369/13.25; 360/114.06, 114.03
See application file for complete search history.

(56) References Cited

U.S. PATENT DOCUMENTS

| 5,696,372 | A | | 12/1997 | Grober et al. ............... 250/216 |
| 5,986,978 | A | * | 11/1999 | Rottmayer et al. ......... 369/13.17 |
| 6,324,036 | B1 | | 11/2001 | Dill, Jr. et al. ............. 360/320 |
| 2003/0112542 | A1 | * | 6/2003 | Rettner et al. ................ 360/59 |
| 2003/0184903 | A1 | * | 10/2003 | Challener .................... 360/59 |
| 2004/0228022 | A1 | * | 11/2004 | Ueyanagi ..................... 360/59 |
| 2005/0018547 | A1 | * | 1/2005 | Akiyama et al. ........ 369/13.02 |

FOREIGN PATENT DOCUMENTS

WO    WO 01/863276 A2    11/2001

OTHER PUBLICATIONS

Shi, Xiolei et al, "A Nano-aperture with 1000x Power Throughput Enhancement for Very Small Aperture Laser System (VSAL)", 2002, Proc. SPIE v. 4342 p. 320-327.*
Sun, Weimin and Balanis, Constantine A., "MFIE Analysis and Design of Ridged Waveguides", Nov. 1993, v. 41, n. 11, p. 1965.*
Bain, "Magnetic Recording Devices: Inductive Heads, Properties," *Encyclopedia of Materials: Science and Technology*, Elsevier Science Ltd., 2001, pp. 4868-4879.
Rausch et al., "Near Field Hybrid Recording with a Mode Index Waveguide Lens," *Proc. SPIE*, vol. 4090, 2000.
Spice, "Itsy-Bitsy: Hard drives bumping up against physical limits," *Pittsburgh Post-Gazette*, Oct. 29, 2001.
Shi et al., "A Nano-aperture with 1000x Power Throughput Enhancement for Very Small Aperture Laser System (VSAL)," *Proc. SPIE*, vol. 4342, 2001.

* cited by examiner

*Primary Examiner*—Julie Anne Watko
(74) *Attorney, Agent, or Firm*—Kirkpatrick & Lockhart Nicholson Graham LLP

(57) ABSTRACT

A device for writing data to a recording medium and a method for fabricating the device is presented. According to one embodiment, the device includes an electrical conductor having a cross-track portion, wherein the cross-track portion includes first and second opposing surfaces, and wherein the cross-track portion defines an aperture extending from the first surface to the second surface. The device also includes a dielectric portion disposed in the aperture such that the dielectric portion defines a ridge waveguide having a lowest-order mode cut-off frequency that is less than the frequency of incident optical energy used to heat the recording medium.

55 Claims, 12 Drawing Sheets

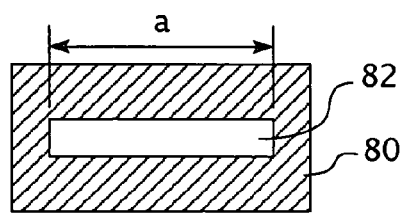
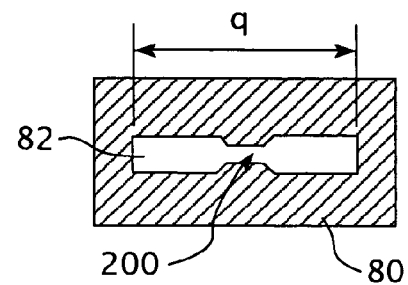
FIG. 10  FIG. 11
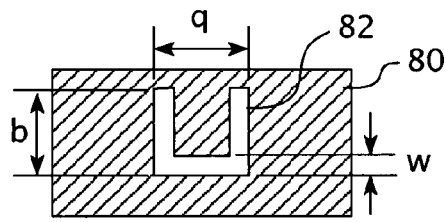
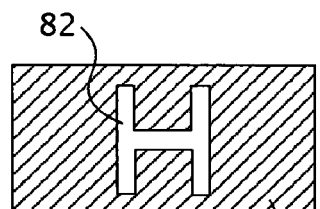
FIG. 12  FIG. 13
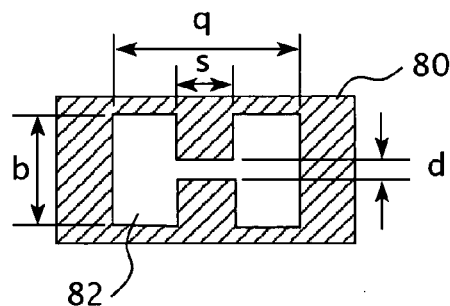
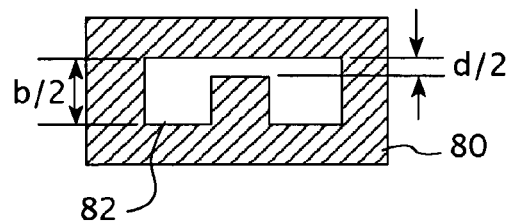
FIG. 14  FIG. 15
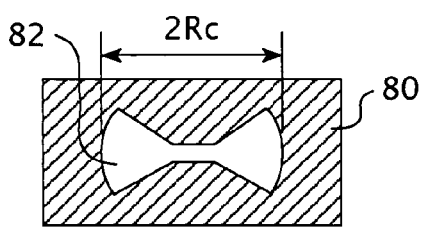
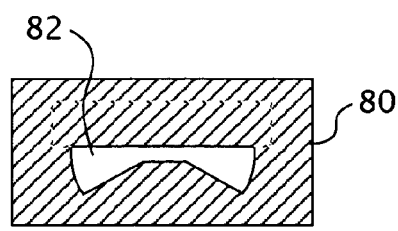
FIG. 16  FIG. 17

DEVICE WITH WAVEGUIDE DEFINED BY DIELECTRIC IN APERTURE OF CROSS-TRACK PORTION OF ELECTRICAL CONDUCTOR FOR WRITING DATA TO A RECORDING MEDIUM

BACKGROUND OF THE INVENTION

In conventional hard disk drive systems, an integrated read/write head is used to write binary data to and read binary data from a recording medium. The recording medium, i.e., the disk, is coated with a ferromagnetic film that is either amorphous or contains tiny magnetic grains, each of which may be considered a magnet. For granular media, each magnetic mark is an area of the medium containing hundreds of grains. Data are recorded on the medium by causing the grains in each mark to align themselves so that their north-south poles point in the same direction. For this purpose, the write portion of the read/write head may induce a magnetic field in the region of the recording medium. The grains may be aligned, for example, longitudinally or perpendicularly relative to the plane of the disk. The read portion of the read/write head may use a magnetoresistive sensor.

Storage densities in hard disk drives using conventional longitudinal magnetic recording have been increasing at between 60% and 100% per year. In addition, storage densities in excess of 100 Gbit/in² have been demonstrated. However, this trend may reach physical limits at densities beyond 1 Tbit/in². One limiting factor is the so-called "superparamagnetic limit."

The superparamagnetic limit may be described thusly. The need to maintain a given signal-to-noise (SNR) ratio requires that the size of the grains within a mark must be scaled with the area of the mark. However, as the size of the grains is reduced they become thermally unstable. In that connection, it has been determined that to be thermally stable for a period of ten years, the following relation must hold for granular media:

$$\frac{K_u V}{k_B T} \approx 40 - 70 \qquad (1)$$

where $K_u$ is the media anisotropy energy density, V is the grain volume, $k_B$ is Boltzman's constant, and T is the temperature of the medium. Thus, as the volume of the grains is reduced, the anisotropy of the material must be increased. However, the coercive field $H_c$ is proportional to the anisotropy and any increase in $K_u$ results in an increase in $H_c$, ultimately making the medium unwriteable because it is not possible to generate arbitrarily large write fields with conventional magnetic heads. In the case of amorphous media, a similar limit exists.

One known technique of addressing this consideration is heat-assisted magnetic recording, in which a heat source, such as a focused optical beam from a laser, is used to reduce the coercivity of the medium during the writing process. This technique is used in standard magneto-optic recording. Heat-assisted magnetic recording allows for the use of high anisotropy media, which are quite stable at room temperature and which could not otherwise be written to with conventional thin film write heads.

Hybrid recording is a technique that combines heat-assisted magnetic recording for the write process, and sensitive magnetoresistive sensors for read back. For this type of recording, however, it is desirable to bring the optical field, the magnetic field and the read sensor of the integrated read/write head to the recording medium in a manner consistent with the storage density of the recording medium, which as described previously are headed for 1 Tbit/in² and beyond.

For high-density storage applications, however, such as 1 Tbit/in² and beyond, it is likely necessary to be able to produce intense optical spots as small as 50 nm or smaller, which is well below (such as by an order of magnitude) that which can be achieved with advanced diffraction-limited optical systems. Moreover, a further key enabling technology for future high-density hybrid recording systems is the capability to collocate the optical spot with the applied magnetic field.

BRIEF SUMMARY OF THE INVENTION

In one general respect, the present invention is directed to a device for writing data to a recording medium. According to one embodiment, the device includes an electrical conductor having a cross-track portion, wherein the cross-track portion includes first and second opposing surfaces, and wherein the cross-track portion defines an aperture extending from the first surface to the second surface. The device further includes a dielectric portion disposed in the aperture such that the dielectric portion defines a waveguide having a lowest-order mode cut-off frequency that is less than the frequency of incident optical energy used to heat the recording medium. The device may additionally include means for focusing the incident optical energy onto the dielectric portion at the first surface of the cross-track portion of the electrical conductor.

In another general respect, the present invention is directed to a read/write head. According to one embodiment, the read/write head includes a magnetoresistive sensor oriented to carry current in a cross-track direction of a recording medium. In addition, the read/write head includes an electrical conductor having a cross-track portion (i.e., oriented in the same direction as the magnetoresistive sensor relative to a track of a recording medium), wherein the cross-track portion includes first and second opposing surfaces, and wherein the cross-track portion defines an aperture extending from the first surface to the second surface. The read/write head also includes a dielectric portion disposed in the aperture such that the dielectric portion defines a waveguide having a lowest-order mode cut-off frequency that is less than the frequency of energy from the energy source used to heat the recording medium.

In another general respect, the present invention is directed to a method of fabricating a device for recording data on a recording medium. According to one embodiment, the method includes forming a first electrically conductive layer on a surface, etching the electrically conductive layer to define a recess therein, and forming a dielectric layer in the recess. The method further includes forming a second electrically conductive layer on the first electrically conductive layer and on the dielectric layer, such that the first and second electrically conductive layers and the dielectric layer define a waveguide having a lowest-order mode cut-off frequency that is less than the frequency of incident optical energy used to heat the magnetic medium.

In another general respect, present invention is directed to a method of fabricating a read/write head. According to one embodiment, the method includes: forming an electrical conductor layer having a height and such that the electrical conductor layer defines an aperture; forming a dielectric portion in the aperture, the dielectric portion having a height; and forming a magnetoresistive sensor adjacent to the electrical conductor layer. The method further includes lapping, such as mechanical lapping, the electrical conductor, the dielectric portion and the magnetoresistive sensor layer such that the height of each is the same. According to one embodiment, forming the electrical conductor layer may include selectively depositing, etching and planarizing an electrically conductive material to define the electrical conductor layer. The lapping step may include mechanical lapping. The term "adjacent" does not necessarily mean directly adjacent, but instead contemplates the inclusion of other layers therebetween.

DESCRIPTION OF THE FIGURES

Embodiments of the present invention are described in conjunction with the following figures, wherein:

FIGS. 9g–9q illustrate a process of fabricating the write portion of the read head according to another embodiment;

FIGS. 10–19 are cross-sectional views of the cross-track portion of the write portion of the read/write head according to other embodiments of the present invention.

DETAILED DESCRIPTION OF THE INVENTION

It is to be understood that the figures and descriptions of the following embodiments have been simplified to illustrate elements that are relevant for a clear understanding of the present invention, while eliminating, for purposes of clarity, other elements. For example, the read circuit for reading the resistance change of a magnetoresistive sensor of the read portion of an integrated read/write head is not described herein. Nor, for example, is the write circuit of the write portion of an integrated read/write head described herein. Those of ordinary skill in the art will recognize, however, that these and other elements may be desirable in a read/write head. However, because such elements are well known in the art, and because they do not facilitate a better understanding of the present invention, a discussion of such elements is not provided herein. In addition, the figures are not necessarily drawn to precise scale.

Figure 1:
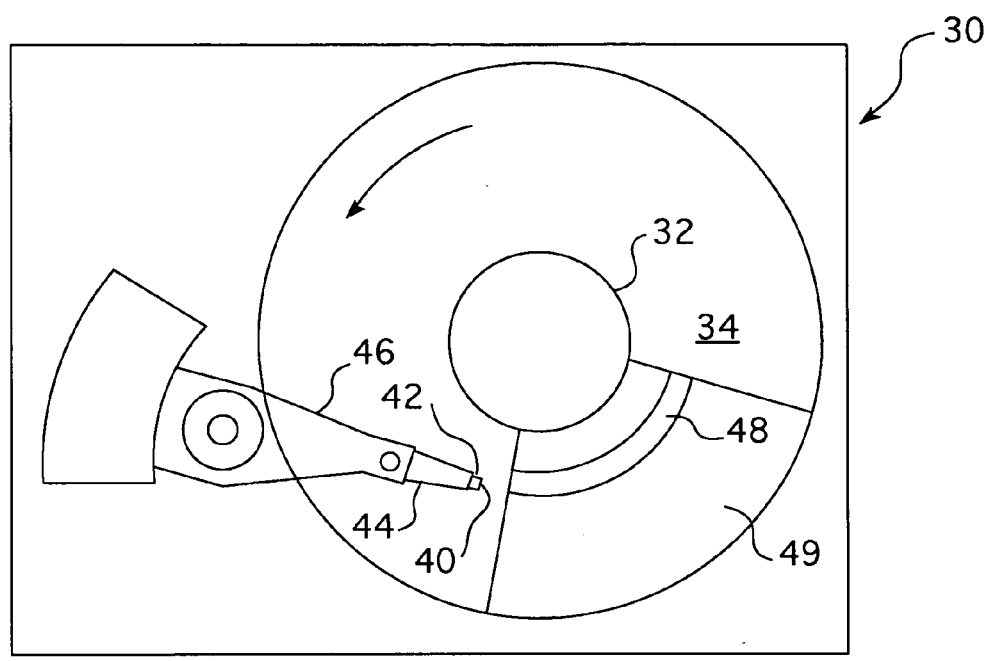
FIGS. 1 and 2 illustrate a type of disk drive assembly.
Figure 2:
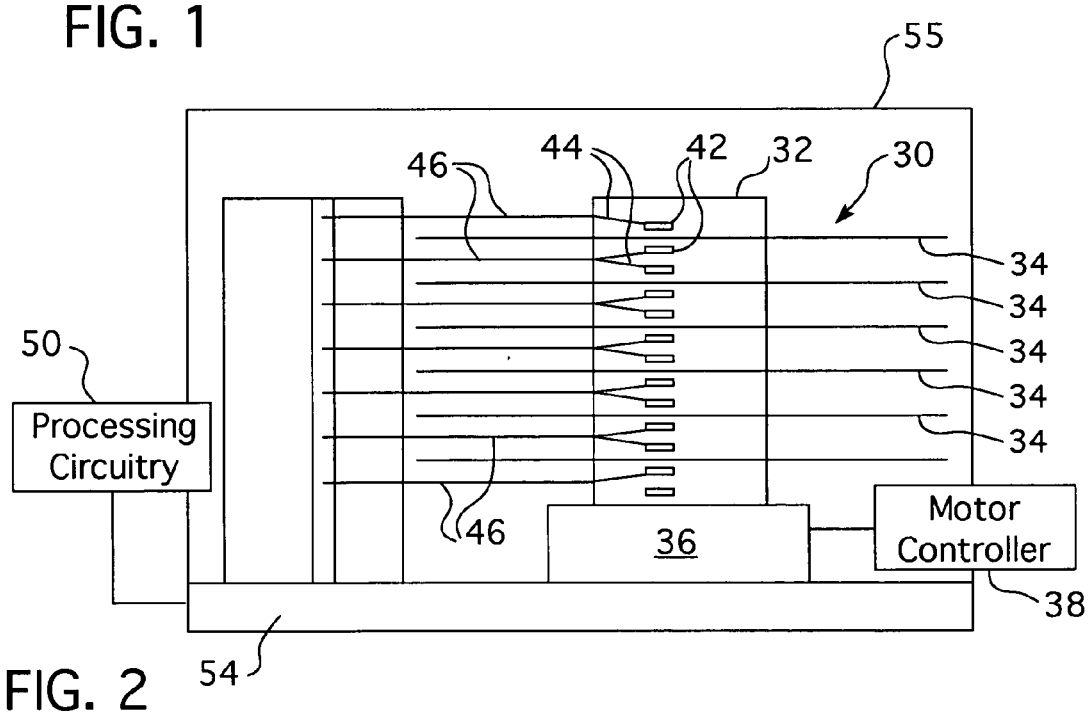

FIGS. 1 and 2 illustrate a type of disk drive assembly 30 that may utilize the present invention. The assembly 30 includes a spindle 32 that supports and rotates a magnetic disk 34. The spindle 32 may be rotated by a motor 36 that is controlled by a motor controller 38. A read/write head 40 may be mounted on an air-bearing slider 42 that is supported by a suspension 44 and an actuator arm 46. The assembly 34 may include a number of such disks 34, sliders 42 and suspensions 44 may be employed, as illustrated in FIG. 2, such as for a large capacity direct access storage device (DASD). The suspension 44 and the actuator arm 46 position the slider so that the read/write head 40 may be in a transducing relationship with the surface of the disk 34.

Data may be stored on the disk 34 in a pattern of numerous sectors and tracks. A track 48 for a sector 49 of the disk 34 is shown in FIG. 1. When the motor 36 rotates the disk 34, the slider 42 may be supported by a thin layer of air (such as 0.05 μm or less) between the surface of the disk 34 and read/write head 40. The read/write head 40 may be used for writing binary data to the tracks on the surface of the disk, as well as reading the binary data therefrom. A processing circuit 50 may exchange signals, representing such data, with the head 40, provide motor drive signals for rotating the disk 34 to the motor controller 38, and provide control signals to the actuator 46 for positioning the slider 42 over various tracks of the disk 34. The above-described components of the assembly 30 may be mounted on a frame 54 of a housing 55.

Figure 3:
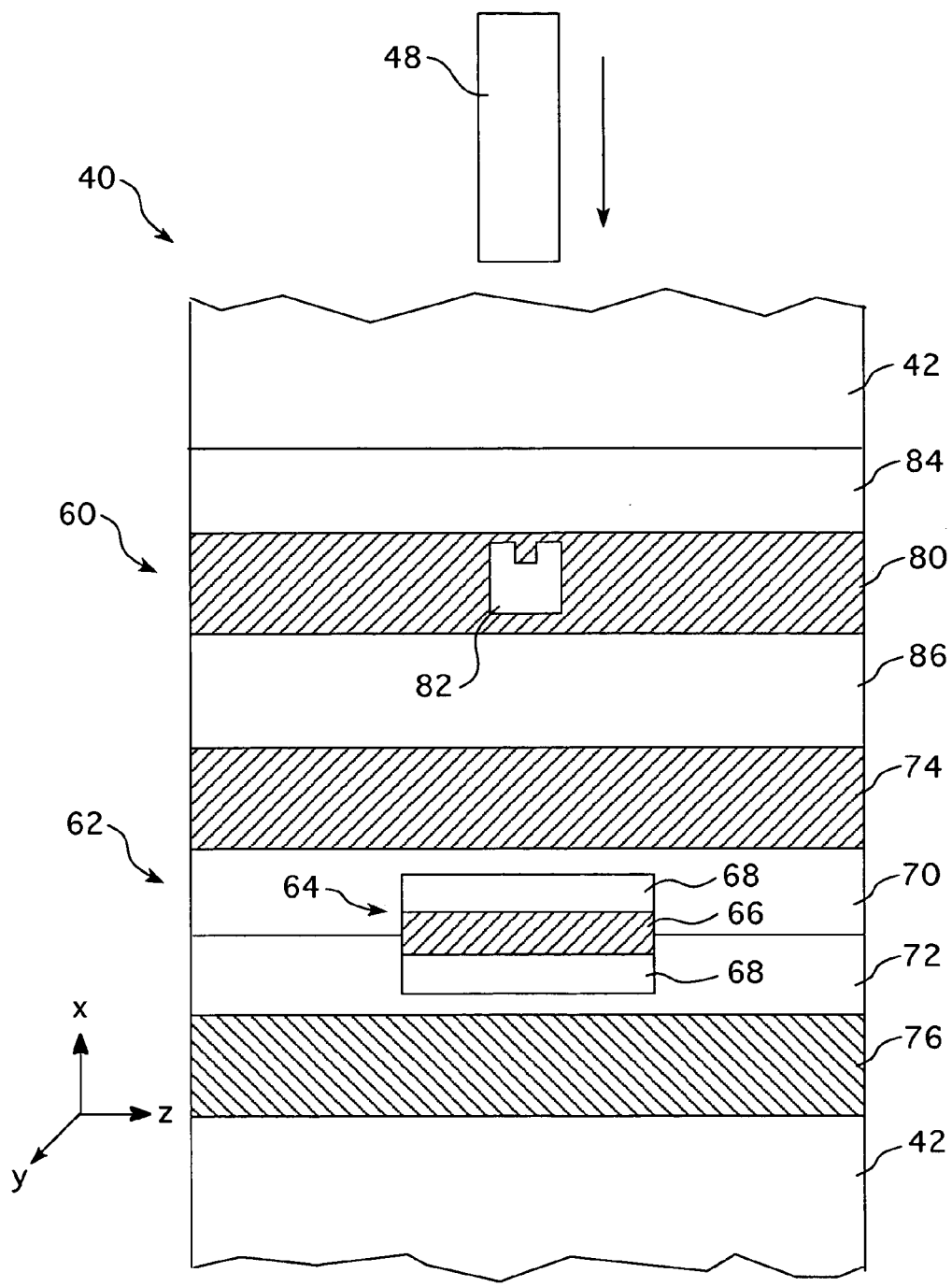
FIG. 3 is a partial view of the air-bearing surface (ABS) of a read/write head according to one embodiment of the present invention.

FIG. 3 is a partial view of the air-bearing surface (ABS) of the read/write head 40 according to one embodiment of the present invention. The track 48 of the recording medium may move relative to the head 40 in the direction indicated by the arrow in FIG. 3. The head 40 may be separated in the y-direction (into and out of the drawing sheet; see FIG. 20 for a perspective view) relative to the coordinate system shown in FIG. 3 from the recording medium by an aerodynamically-defined distance. The read/write head 40 includes a write portion 60 and a read portion 62. The read portion 62 may utilize, for example, a CIP (current in plane) configuration or a CPP (current perpendicular to plane) configuration.

The read portion 62 includes, for example, a magnetoresistive sensor 64, whose electrical resistance may change when brought into contact with the magnetic field produced by opposingly oriented flux regions (not shown) of the track 48. The change in electrical resistance of the magnetoresistive sensor 64 may be sensed by a read circuit (not shown). According to one embodiment, the magnetoresistive sensor 64 may be a giant magnetoresistive (GMR) sensor, including at least one non-magnetic metal layer 66 sandwiched by two ferromagnetic layers 68. The non-magnetic metal layer 66 may be fabricated from an electrically conductive/magnetically non-conductive material such as, for example, copper, and the ferromagnetic layers 68 may be fabricated from a magnetic material such as, for example, a nickel-iron-copper (NiFeCo) composition.

The magnetoresistive sensor 64 may be located between first and second gap layers 70, 72, which are located between first and second shield layers 74, 76. The gap layers 70, 72 may include any material suitable for electrically isolating the conductive layers of the read/write head 40 such as, for example, $Al_2O_3$ or $SiO_2$. The shield layers 74, 76 may be fabricated from a soft ferromagnetic material such as, for example, NiFe.

The write portion 60 of the head 40 includes an electrically conductive strip (i.e. layer) 80 defining an aperture. The electrically conductive strip 80 may be fabricated from an electrically conductive material such as, for example, gold, copper, aluminum or silver. The aperture may be filled with a dielectric material 82 such as, for example, $Al_2O_3$, $SiO_2$, SiN or air. The electrically conductive strip 80 may conduct current from the write circuit (not shown) to thereby induce a magnetic field in the region of the disk 34 to cause the grains in each mark of the track to properly align themselves as part of the data writing process. As described in more detail hereinafter, the aperture may be shaped according to one embodiment such that the dielectric 82 therein provides an effective ridge waveguide for optical energy that may propagate therethrough to heat the disk 34 as it is being written to by the write portion 60 of the read/write head 40.

As illustrated in FIG. 3, the write portion 60 may include isolating layers 84, 86 to electrically isolate the electrically conductive strip 80. The isolating layer 84, 86 may be fabricated from an electrically nonconductive material such as, for example, $Al_2O_3$ or $SiO_2$. The read/write head 40 may include additional layers than are not shown in FIG. 3 for purposes of convenience and clarity.

Figure 4:
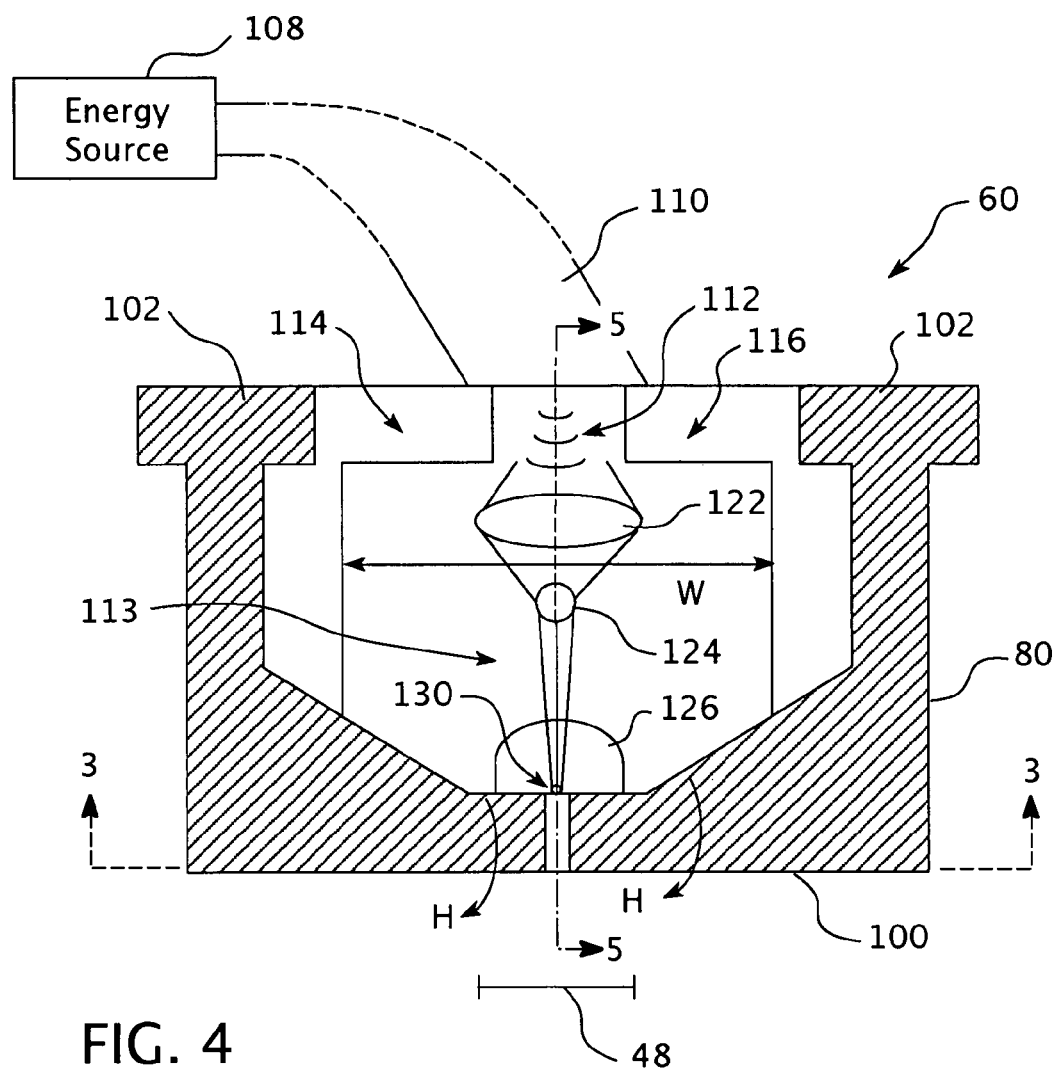
FIG. 4 is a cross-sectional top view of the write portion of the read/write head of FIG. 3 according to one embodiment.

FIG. 4 is a cross-sectional view of the write portion 60 according to one embodiment. As illustrated in FIG. 4, the electrically conductive strip 80 includes a cross-track portion 100 that defines the aperture that may be filled with the dielectric 82. Electrical current may be supplied to the conductive strip 80 from a write circuit (not shown) coupled to lead portions 102 of the conductive strip 80. Current flowing through the cross-track portion 100 of the conductive strip 80 may induce a magnetic field H for writing to a track 48 of the magnetic recording medium. Accordingly, the cross-track portion 100 may be oriented the same way as the magnetoresistive sensor 64 of the read portion 62 (see FIG. 3) relative to the track 48 of the recording medium. Thus, for an embodiment in which the read portion 62 is CIP, the magnetoresistive sensor 64 is oriented to carry current in the cross-track direction (z-direction with respect to the coordinates shown in FIG. 3) relative to the recording medium 48. As such, current may flow in the same plane in the cross-track portion 100 as in the magnetoresistive sensor 64.

Optical energy from an optical energy source 108 may be directed onto and through the dielectric 82 disposed in the aperture defined by the cross-track portion 100 to thereby heat the magnetic medium 48 and reduce its coercivity, thus facilitating the writing process. The energy source 108 may be a laser such as, for example, a solid state laser or any one of a number of semiconductor lasers (such as a Fabry-Perot diode laser). According to another embodiment, the energy source 108 may be coupled to the waveguide by, for example, a prism coupler.

Energy from the energy source 108 may be coupled to the write portion 60 by a fiber optic cable 110. Optical energy from the fiber optic cable 110 may then propagate through a pair of optical waveguide channels 112, 113, which may be formed, for example, by thin film deposits. The thin films may include a guiding layer between sidewall cladding layers 114, 116, as well as upper and lower cladding layers (shown in FIG. 5), with a guiding layer of, for example, $SiN_x$ therebetween. The cladding layers may be fabricated from, for example, $SiO_2$.

The first optical waveguide channel 112 may provide a mode selection means for the optical energy from the fiber optic cable 100 by, for example, allowing a single mode to propagate through the optical waveguide channel 112 and cutting off propagation of higher order modes. This mode selection can be used to efficiently couple optical energy into the dielectric portion 82 in the aperture. The first optical waveguide channel 112 may be configured as, for example, a dielectric ridge waveguide channel, a strip-loaded waveguide channel, a gain guided waveguide channel, a doped waveguide channel or a diffused waveguide channel. The channel waveguide 112 may also facilitate the alignment of the optical energy with the lenses of the optical waveguide channel 113, to be described below.

After propagating through the first optical waveguide channel 112, the optical energy may then propagate through the second waveguide channel 113, which may be, for example, a two-dimensional optical waveguide with mode index waveguide lenses. A two-dimensional optical waveguide is one in which the width W (see FIG. 4) of the waveguide is much larger then its thickness T (see FIG. 5). For optical energy to propagate and be confined to the guiding layer of the 2D optical waveguide, the bulk refractive index of the cladding layers must be less then the refractive index of the guiding layer, which may be fabricated from $SiN_x$, as described previously. The fields within the 2D optical waveguide are solutions of Maxwell's equations and which modes propagate depend on the materials used in the fabrication and on the thickness of the guiding layer. Propagation within the 2D optical waveguide 113 may be described in terms of allowed modes. As the thickness T of the guiding layer increases, more modes are able to propagate. Within the guiding layer, each mode may be described by a plane wave with an amplitude that varies along the thickness of the waveguide. In addition, each mode behaves as if it is in a medium of refractive index given by the mode index. The mode index is different for each mode and is a function of the thickness of the guiding layer.

Using the dependence of the mode index on the thickness of the guiding layer it is possible to fabricate two-dimensional waveguide lenses. Lenses fabricated in such a manner behave essentially as two-dimensional optical elements, except the mode index is used in analogy to the refractive index. Focusing occurs in the plane of the waveguide and the optical spot at the focal plane has dimensions given by the diffraction limited focusing of the waveguide lens and thickness of the guiding layer. More details regarding two-dimensional optical waveguides and waveguide lenses is provided in Rausch et al., "Near Field Hybrid Recording with a Mode Index Waveguide Lens," Proc. SPIE, Vol. 4090, Optical Data Storage 2000, p. 66 (2000), which is incorporated herein by reference.

With reference to FIG. 4, the 2D optical waveguide 113 of the write head 60 may include a lens system comprising, for example, lenses 122, 124, 126 for focusing the optical spot 130 of the optical energy onto the aperture defined by the cross-track portion 100 of the conductive strip.

Figure 5:
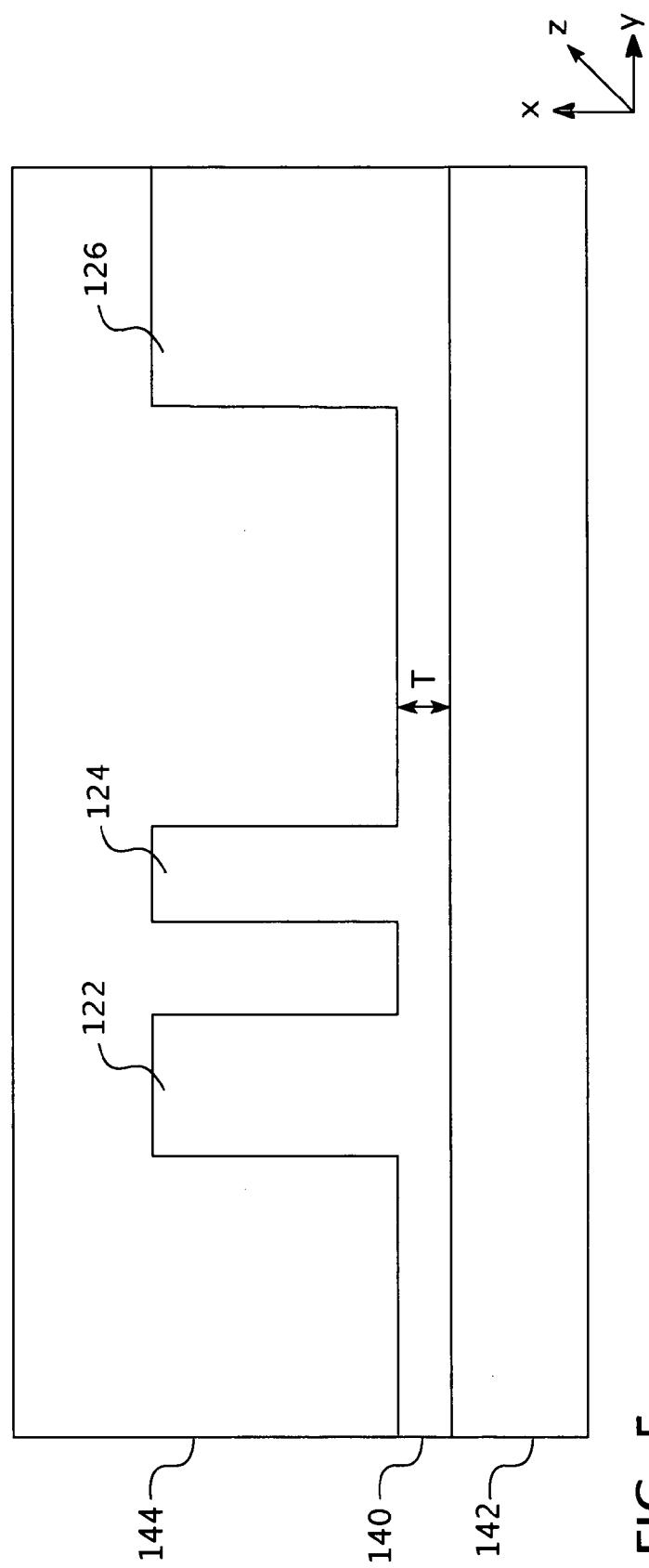
FIG. 5 is a cross-sectional side view of the write portion of FIG. 4 according to one embodiment.

FIG. 5 is a side view of the waveguide lens system of FIG. 4 according to one embodiment. As illustrated in FIG. 5, the guiding layer 140 is deposited after deposition of the first, lower cladding layer 142 and prior to deposition of the second, upper cladding layer 144. The waveguide lenses 122, 124, 126 may be defined by varying the thickness T of the guiding layer 140 to allow for change in the mode index, as described previously. For example, according to one embodiment, the thickness of the narrow portion of the guiding layer 140 may be on the order of 100 nm, while the thickness of the lenses 122, 124, 126 may be on the order of 400nm. According to another embodiment, the lenses 122, 124, 126 may be defined by different materials, as described previously, or a combination of both varying thickness and different materials.

According to one embodiment, the lens system may comprise a 2D waveguide objective lens 122 and 2D solid immersion lens (SIL) 126. Other embodiments may comprise different lens systems for focusing the optical energy onto the focus spot 130. For example, according to one embodiment, the lens system may include 2D collimating lenses and a 2D integrated solid immersion lens (ISIL), such as described in U.S. patent application Ser. No. 09/568,895, filed 11 May 2000, now U.S. Pat. No. 6,594,430, which is incorporated herein by reference.

Figure 6:
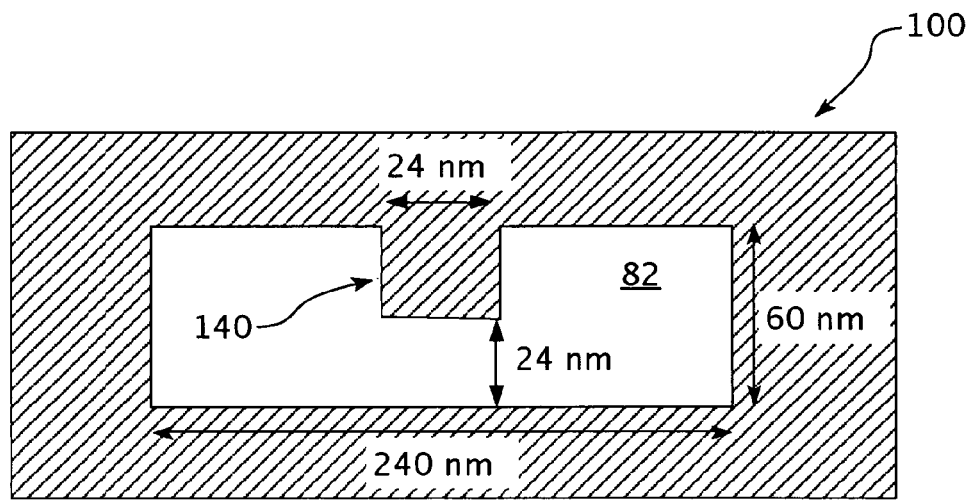
FIGS. 6 and 7 are cross-sectional views of the cross-track portion of the electrical conductor of the write portion of the read/write head according to one embodiment.

FIG. 6 is a cross-sectional view of the cross-track portion 100 of the electrically conductive strip 80 according to one embodiment of the present invention. The dimensions provided in FIG. 6 are illustrative and not intended to be limiting. As illustrated, the aperture defined by the cross-track portion 100, with the dielectric 82 disposed therein, may provide, according to one embodiment, a ridge waveguide for the optical energy from the fiber optic cable 110. The shape of the aperture (e.g., ridge in the illustrated embodiment), the dimension of the aperture, and the wavelength of the incident energy may be chosen such that the waveguide is not in cut-off mode, i.e., the optical energy is capable of propagating through the dielectric 82 and impinge on the track of the recording medium.

For a ridge waveguide, such as illustrated in FIG. 6, the field intensity in the aperture is concentrated in the region below the ridge 140. A waveguide having the dimensions shown in FIG. 6 resonates at 630 nm, with higher-order modes attenuated at the output of the aperture by more than 20 dB. The transmission is limited by the loss of the electrically conductive strip 80 rather than by evanescent decay of a mode below cutoff. The thickness of the cross-track portion 100 (i.e., the dimension orthogonal to the figure) may be on the order of one λ, which for optical frequencies is on the order of 500 nm. Finite Difference Time Domain has shown that for a waveguide having the dimensions of FIG. 6, the field is enhanced by a factor of forty at the position immediately below the ridge 140, thus providing a sufficiently small optical spot for high-density storage applications.

According to one embodiment, the cross-sectional shape of the aperture defined by the cross-track portion 100, and hence the cross-sectional shape of the dielectric 82 disposed therein, may be uniform along the length of the aperture. According to other embodiments, the cross-sectional shape of the aperture may vary along the length of the aperture. For example, the area of the aperture may be larger at the input end than at the output end, and vice-versa. For example, the aperture may taper from front to back or from back to front. According to other embodiments, the area may remain relatively the same, but the shape may change. The variance in cross-sectional shape along the length of the aperture may be, for example, continuous or discrete.

Figure 7:
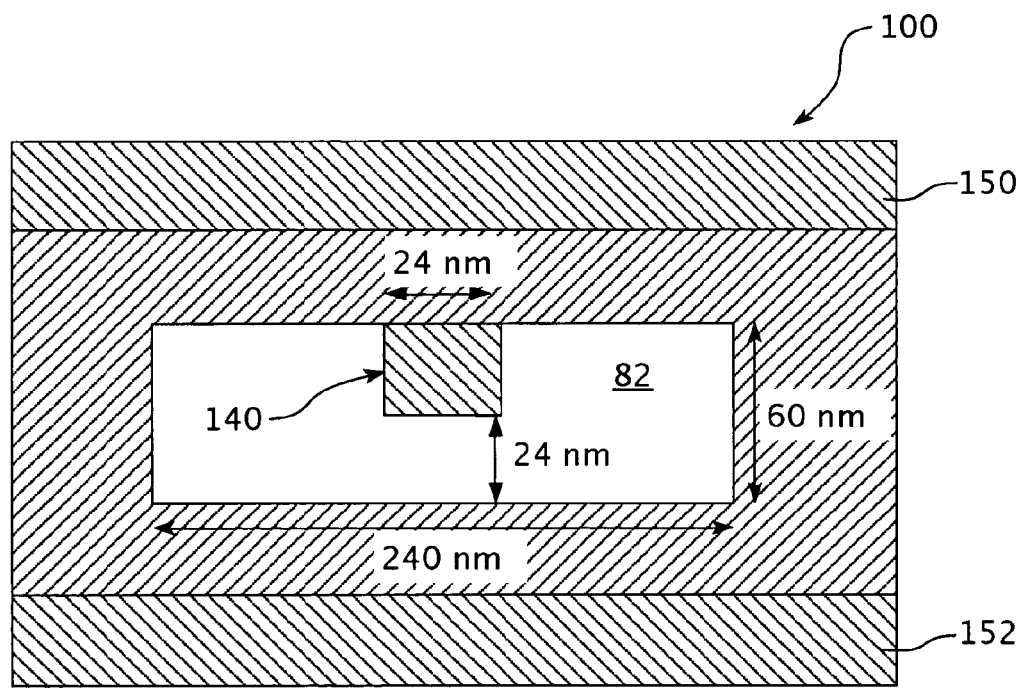

According to another embodiment, as illustrated in FIG. 7, the ridge portion 140 may be fabricated from a different material than the cross-track portion 100. For example, the ridge portion 140 may be fabricated from a magnetic material such as, for example, FeCo or NiFe. In addition, as illustrated in FIG. 7, the write portion 60 may include magnetic layers 150, 152 above and below the cross-track portion 100 of the electrical conductor 80. The magnetic layers 150, 152 may also be fabricated from, for example, FeCo or NiFe, as before. The magnetic ridge portion 140, as well as the magnetic layers 150, 152 may facilitate alignment of the magnetic writing field and the optical energy for a hybrid recording write head, as well as increase the strength of the magnetic field.

Figure 8:
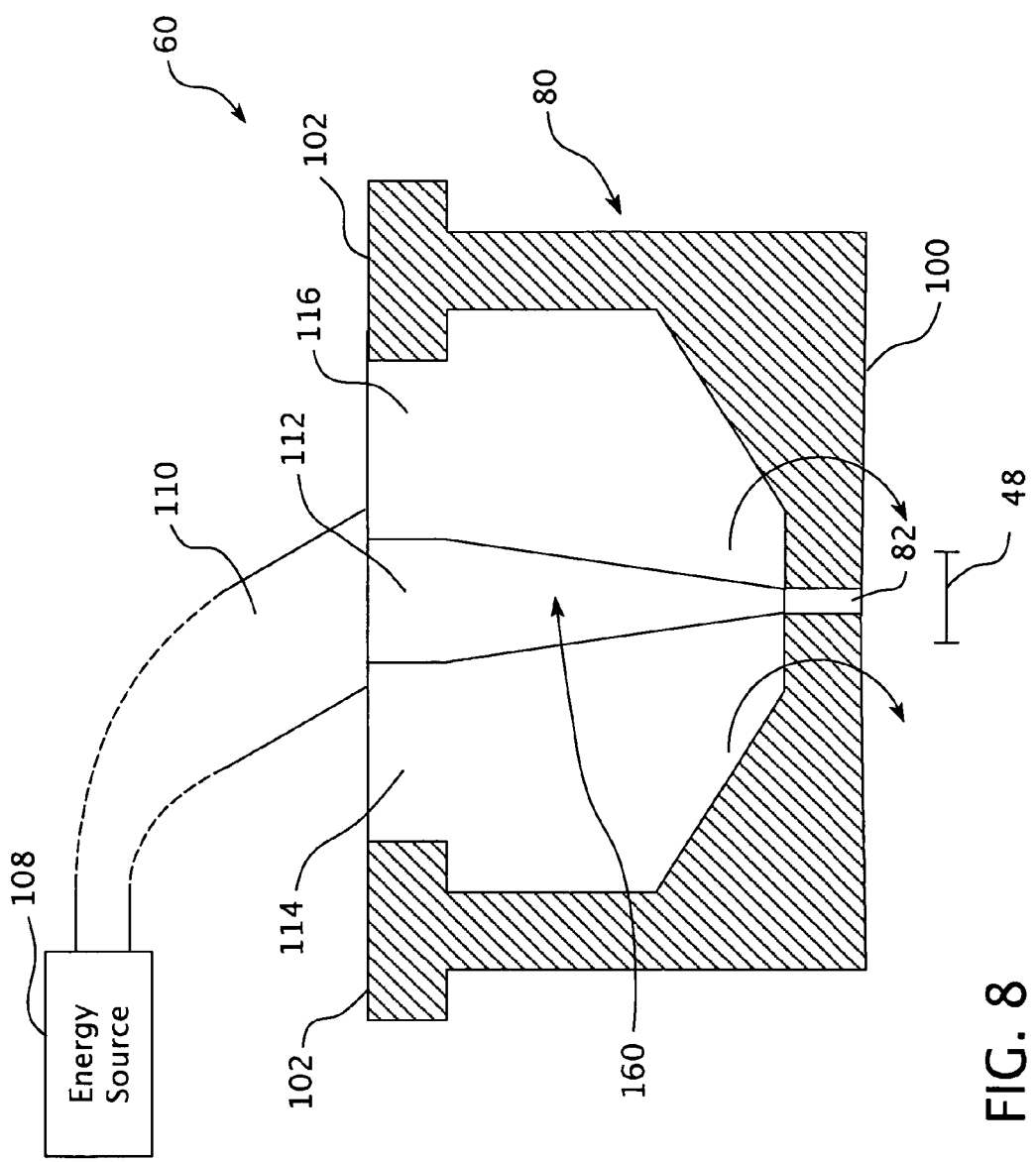
FIG. 8 is a cross-sectional top view of the write portion of the read/write head according to another embodiment.

FIG. 8 is a cross-sectional view of the write portion 60 according to another embodiment. The embodiment of FIG. 8 is similar to that of FIG. 4, except that in FIG. 8 the write portion includes a tapered waveguide 160 for guiding the optical energy from the fiber optic cable 110 to the dielectric 82 in the aperture. Like the 2D optical waveguide 113 in FIG. 4, the tapered waveguide 160 may have an optically transmissive guiding layer of, for example, $SiN_1$ bound by cladding layers 114, 116 of, for example, $SiO_2$. According to one embodiment, the output width of the tapered waveguide 160 is chosen to provide maximum optical energy coupled into the aperture 82.

In another general respect, the present invention is directed to a method of fabricating the write portion 60 of the head 40. The process may include, as described in more detail hereinbelow in conjunction with FIG. 20, any thin film fabrication technique consisting of a series of selective deposition, selective etching and planarization steps to define the aperture 82 in which light propagates in a direction perpendicular to the thin film growth direction (x-direction relative to the coordinate system of FIGS. 3 and 20) and where the length of the aperture (y-direction relative to the coordinate system of FIGS. 3 and 20) is defined in the same step as the one which defines the magnetoresistive sensor 64 height.

FIGS. 9a–9e are cross-sectional diagrams illustrating one process of fabricating the write portion 60 according to one embodiment. Similar processes (with appropriate modifications understood to those skilled in the art) may also be used to fabricate any of the other embodiments described herein.

Figure 9A:
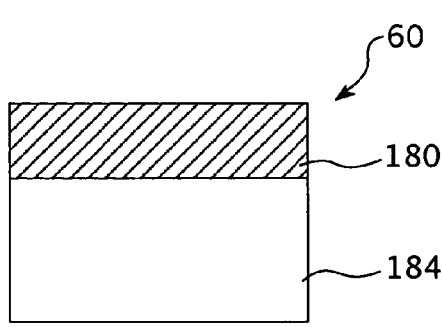
FIGS. 9a–9f illustrate a process of fabricating the write portion of the read head according to one embodiment.

As illustrated in FIG. 9a, the process may include forming a layer of electrically conductive material 180 on a substrate layer 184. The electrically conductive layer 180 may form a portion of the electrical conductor 80 of the write portion 60 of the head 40. The layer 180 may be formed on the substrate 184, for example, by chemical vapor deposition (CVD) or physical vapor deposition (PVD).

Figure 9B:
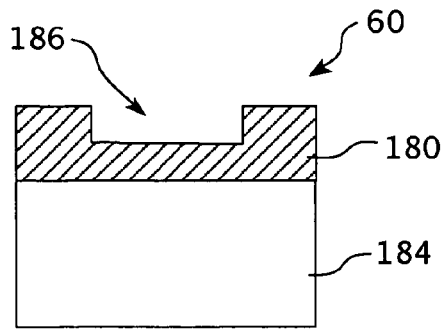

Next, as illustrated in FIG. 9b, a portion of the electrically conductive layer 180 may be removed to define a recess 186. The portion of the electrically conductive layer 180 may be removed through an etching process. The etching process may employ, for example, a wet-etch, a dry-etch, a focused ion beam (FIB) etch, or a reactive ion etch (RIE).

Figure 9C:
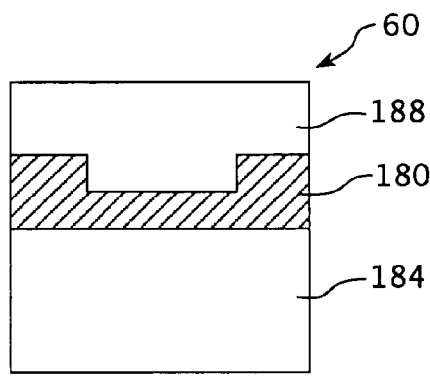
Figure 9D:
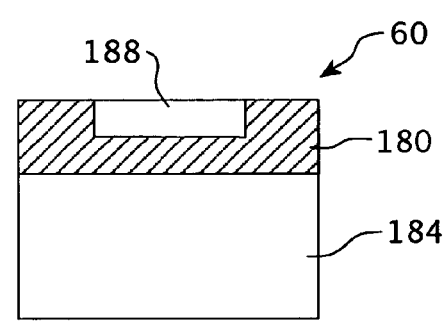

Next, as illustrated in FIG. 9c, a dielectric layer 188 may be formed (such as by, for example, CVD or PVD) on the electrically conductive layer 180. The dielectric layer 188 may comprise the material of the dielectric 82 that is disposed in the aperture defined by the electrical conductor 80. Next, as illustrated in FIG. 9d, the dielectric layer 188 may be planarized such that the dielectric layer 188 is removed from the upper surface of the electrically conductive layer 180 except for the portion formed in the recess 186. The planarizing step may include a chemical or mechanical planarizing, or a suitable designed etching process.

Figure 9E:
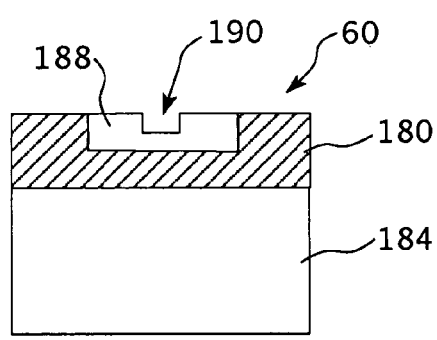
Figure 9F:
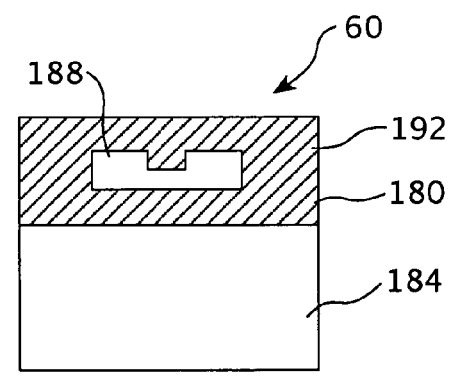

Next, as illustrated in FIG. 9e, a portion of the dielectric layer 188 may be removed to define a recess 190. The portion of the dielectric layer 188 may be removed by etching the dielectric layer, such as, for example, with a wet-etch, a dry-etch, a focused ion beam (FIB) etch, or a reactive ion etch (RIE). Next, as illustrated in FIG. 9f, a second electrically conductive layer 192 may be deposited (such as by, for example, CVD or PVD). The electrically conductive layer 192 may be the same material as the first electrically conductive layer 180, and collectively the two layers 180, 192 may form the electrical conductor 80.

According to another embodiment, the process may include depositing a layer of magnetic material in the recess 190 prior to forming the second electrically conductive layer 192 to produce a ridge waveguide in which the ridge portion comprises a magnetic material, such as described previously in conjunction with FIG. 7. According to other embodiments, also described with reference to FIG. 7, the process may include depositing layers of magnetic material above and/or below the electrically conductive layers 180, 192.

Figure 9G:
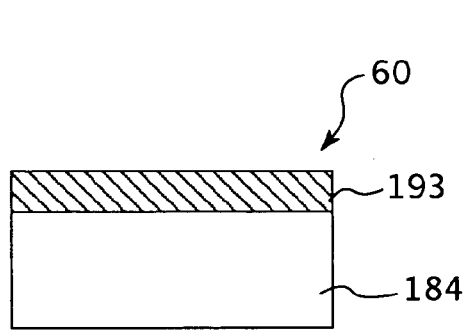
Figure 9H:
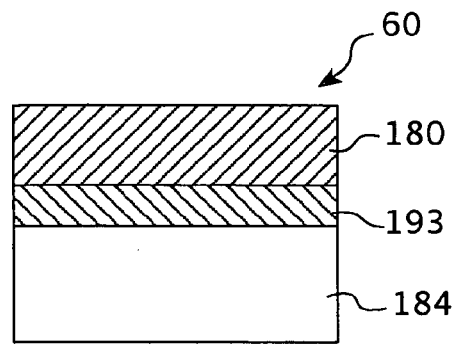
Figure 9I:
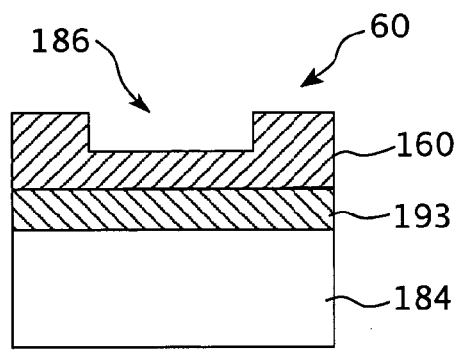

FIGS. 9g–9q are cross-sectional views of the write portion 60 of the read/write head 40 illustrating the process of fabricating the embodiment of FIG. 7. As illustrated in FIG. 9g, a layer of magnetic material 193, such as, for example, a FeCo or an alloy thereof, may be formed on the substrate 184. The magnetic material layer 193 may be formed on the substrate, for example, by CVD or PVD. Next, as illustrated in FIG. 9h, the first electrically conductive layer 180 may be formed on the magnetic material layer 193. Next, as illustrated in FIG. 9i, a portion of the first electrically conductive layer 180 is etched to form a recess 186 therein.

Figure 9J:
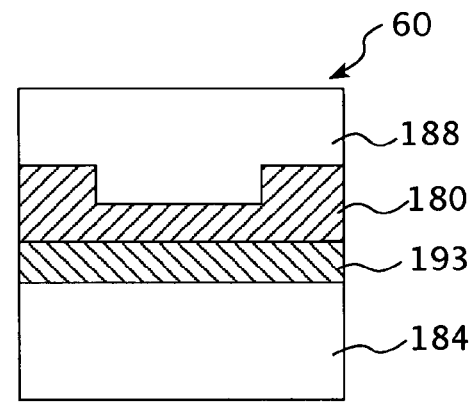
Figure 9K:
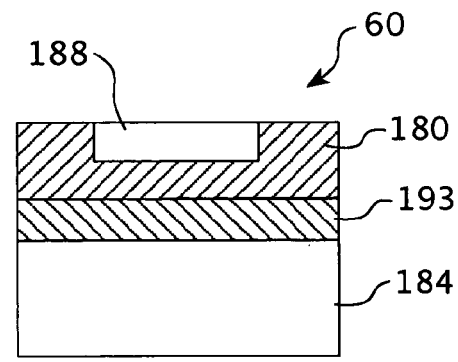
Figure 9L:
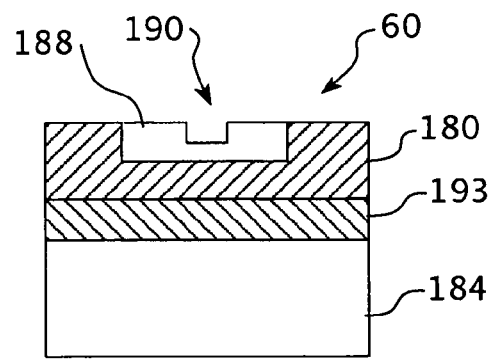

Next, as illustrated in FIG. 9j, the dielectric layer 188 may be formed on the first electrically conductive layer 180, including in the recess 186 defined thereby. Next, as illustrated in FIG. 9k, the dielectric layer 188 may be planarized so that only that portion disposed in the recess 186 defined by the first electrically conductive layer 180 remains. Next, as illustrated in FIG. 9l, the dielectric layer 188 may be etched to define a recess 190 therein.

Figure 9M:
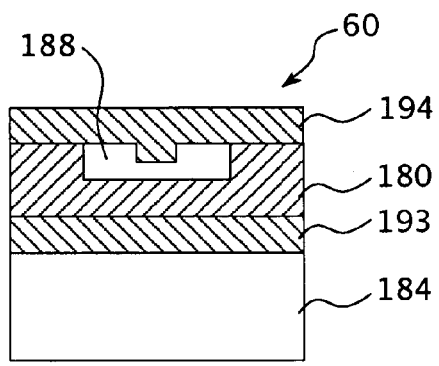

Next, as illustrated in FIG. 9m, another layer of magnetic material 194 may be formed. The magnetic material layer 194, which may comprise, for example, FeCo or an alloy thereof, may be formed on top of the unrecessed portions of the first electrically conductive layer, on top of the unrecessed portions of the dielectric layer 188, as well as in the recess 190 defined by the dielectric layer 188. The magnetic material layer 194 may be formed, for example, by CVD or PVD.

Figure 9N:
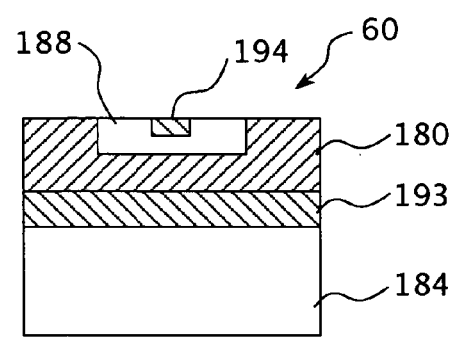

Next, as illustrated in FIG. 9n, the magnetic material layer 194 may be planarized such that only the portion of the magnetic material layer 194 disposed in the recess 190 defined by the dielectric layer 188 remains. The magnetic material layer 194 disposed in the recess 190 defined by the dielectric layer 188 may serve as the magnetic ridge portion 140 of the waveguide structure of FIG. 7.

Figure 9P:
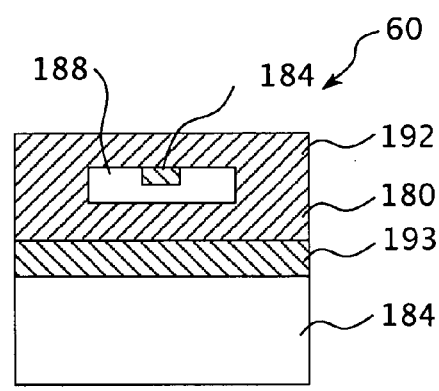

Next, as illustrated in FIG. 9p, the second electrically conductive layer 192 may be formed. The second electrically conductive layer 192 may be formed on top of the unrecessed portions of the first electrically conductive layer 180, the unrecessed portions of the dielectric layer 188, and the magnetic material layer 194. Collectively, the first and second electrically conductive layers 180, 192 may constitute the electrical conductor 80 of the write portion 60 of the read/write head 40.

Figure 9Q:
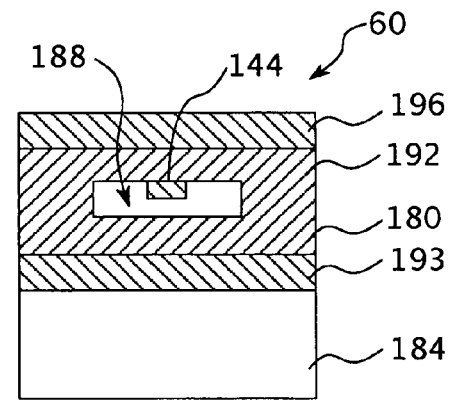

Next, as illustrated in FIG. 9q, another magnetic material layer 196 may be formed on top of the second electrically conductive layer 192, such as by, for example, CVD or PVD. Additional magnetic layers and/or conductors (not shown) may be disposed in other adjacent areas of the device to complete, for example, a magnetic circuit.

For the embodiments described previously, the electrical conductor 80 and the dielectric 82 disposed in the aperture define a ridge waveguide for the optical energy. According to other embodiments, the electrical conductor 80 and the dielectric 82 disposed in the aperture may define waveguides of different configurations. FIGS. 10–19 are cross-sectional diagrams of the electrical conductor 80 showing various waveguide configurations. In FIG. 10 there is illustrated a rectangular waveguide structure. The wavelength of the cutoff frequency for such an embodiment is $\lambda_c = 2a$. In FIG. 11 there is illustrated a modified rectangular waveguide structure. The narrow region 200 in the center may be negligible compared to the overall slot length a.

In FIGS. 12 and 13 there are illustrated folded slot waveguide structures. The aperture of FIG. 12 is U-shaped and the aperture of FIG. 13 is H-shaped. For the embodiment of FIG. 12, the wavelength of the cutoff frequency is estimated by $\lambda_c = 2a + 4b - 4w$, where $2b > a$.

FIGS. 14 and 15 illustrate other ridge waveguide structures. For the embodiment of FIG. 14, the wavelength of the cutoff frequency ($\lambda_c$) may be determined by the relation:

$$\frac{b}{\lambda_c} = \frac{b}{s(a-s)}\left[1 + \frac{4}{\pi}\left(1 + 0.2\sqrt{\frac{b}{a-s}}\right)\frac{b}{a-s}\ln\left(\csc\left(\frac{\pi d}{2b}\right)\right) + \left(2.45 + 0.2\frac{s}{a}\right)\frac{sb}{d(a-s)}\right]^{-1/2} \quad (2)$$

where $0.01 \leq (d/b) \leq 1$, $0 < (b/a) \leq 1$, and $0 \leq (s/a) \leq 0.45$. See Hofer and Burton, "Closed form expressions for parameters of finned and ridge waveguides," *IEEE Trans. Microwave Theory and Tech.*, vol. MTT-30, pp. 2190–2194 (1982).

In FIGS. 16 and 17 there are illustrated radial waveguide structures. For the embodiment of FIG. 16, the wavelength of the cutoff frequency is approximately $\lambda_c \approx 2.86 R_c$.

Figure 18:
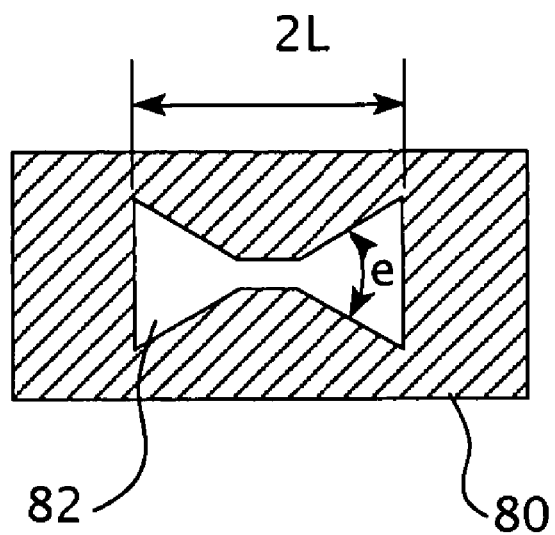
Figure 19:
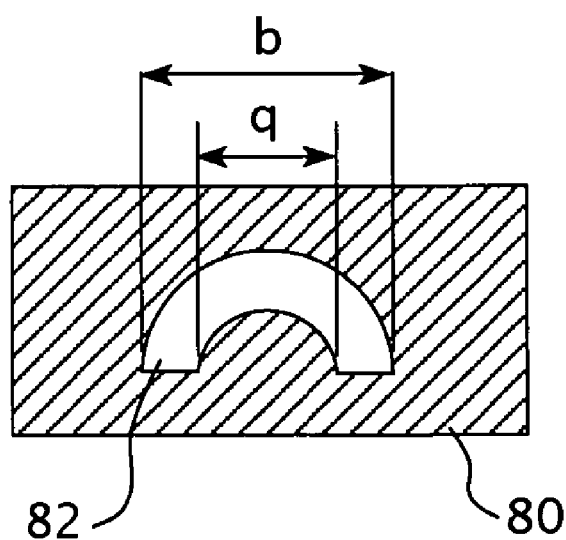

FIG. 18 illustrates a bowtie waveguide structure. The wavelength of the cutoff frequency for this embodiment is $\lambda_c \approx 3.08L$ where $\theta = 90°$. FIG. 19 illustrates a half-coaxial resonator waveguide structure. The wavelength of the cutoff frequency for this embodiment is $$\lambda_c = \frac{1.873}{2}\pi(a+b) \approx \pi(a+b).$$

Figure 20:
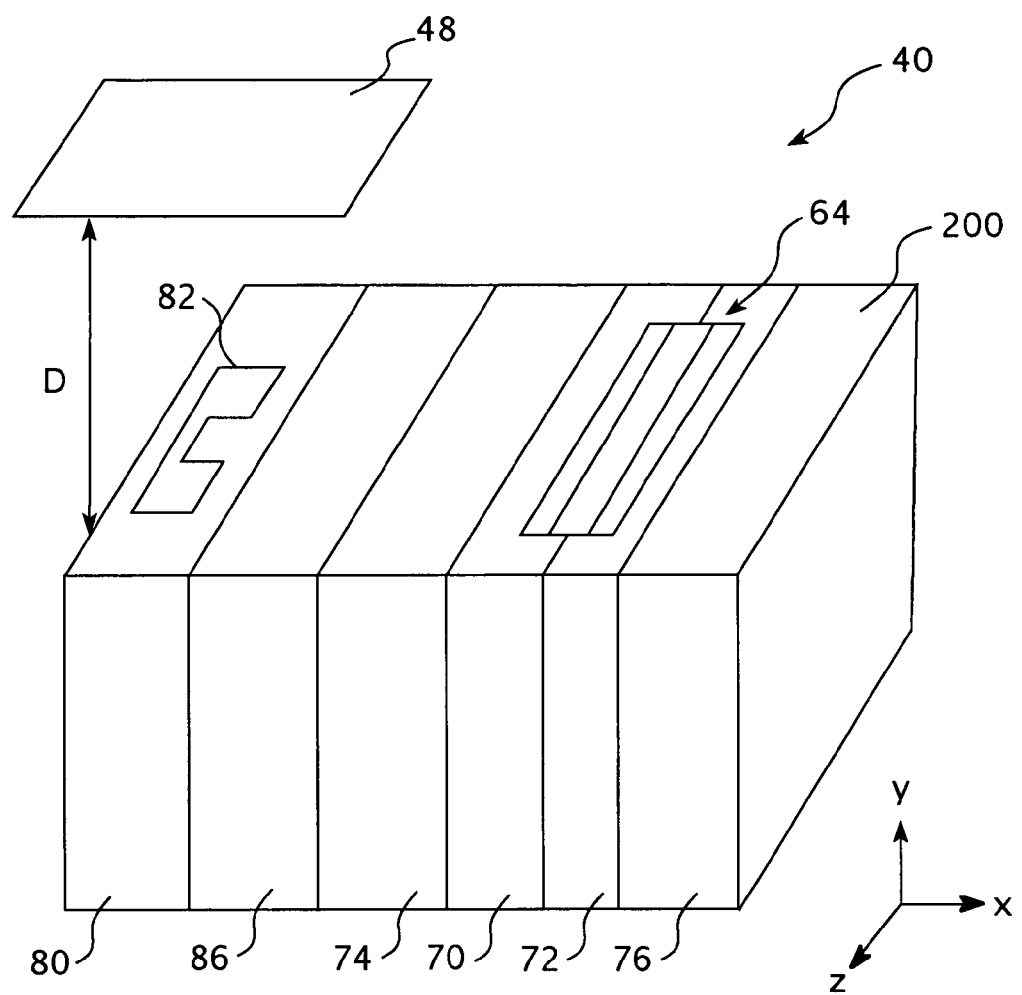
FIG. 20 is a perspective view of a portion of the read/write head according to one embodiment of the present invention.

FIG. 20 is a perspective view showing certain layers of the read/write head 40 according to one embodiment. The read/write head 40 may include additional layers that are not shown in FIG. 20 for the sake of convenience and clarity. As illustrated in FIG. 20, an air-bearing surface (ABS) 200 of the head 40 may face the track 48 of the recording medium, separated by an aerodynamically-defined distance D in the y-direction relative to the coordinate system of FIG. 20.

According to one embodiment, multiple heads 40 may be batch fabricated on a substrate (e.g., a wafer). For example, the various layers of the heads 40 may be formed by selectively depositing materials on the substrate (e.g., a wafer)(not shown) in the x-direction, along with accompanying etching and planarization steps to define the various features of the head 40, such as the aperture 82 and the MR sensor 64. After formation of the layers of the heads 40 is completed, the substrate may be diced into rows, and the resulting rows may be lapped, such as mechanically lapped, to define the height (y-direction) of the MR sensor 64. As such, the lapping process that defines the height (often referred to as "stripe height") of the MR sensor 62 may define the height (y-direction) of the aperture 82.

Once the rows have been lapped to stripe height, an airbearing contour (not shown) may be formed on the ABS 200 on each head 40 in the row. Once the air bearings are complete, the rows may be diced into the individual heads 40. Additional details regarding the fabrication process generally are provided in Bain, "Magnetic Recording Devices: Inductive Heads, Properties," *Encyclopedia of Materials: Science and Technology*, Elsevier Science Ltd., 2001, pp. 4868–4879, which is incorporated herein by reference.

Although embodiments of the present invention have been described with reference to an integrated read/write head, benefits of the present invention may also be realized in, for example, a write head that is not integrated with a read head. In addition, although the present invention has been described herein with respect to certain embodiments, those of ordinary skill in the art will recognize that many modifications and variations of the present invention may be implemented. For example, different materials may be used than those specified previously. In addition, different processing techniques may be used to fabricate portions of the read/write head 40. The foregoing description and the following claims are intended to cover all such modifications and variations.

What is claimed is:

1. A device for writing data to a recording medium, comprising:
   an electrical conductor having a cross-track portion, wherein the cross-track portion includes first and second opposing surfaces, and wherein the cross-track portion defines an aperture extending from the first surface to the second surface; and
   a dielectric portion disposed in the aperture such that the dielectric portion defines a waveguide having a lowest-order mode cut-off frequency that is less than the frequency of incident optical energy that propagates through the waveguide and impinges on the recording medium.

2. The device of claim 1, wherein the waveguide defined by the dielectric portion is a ridge waveguide.

3. The device of claim 2, further comprising a magnetic portion disposed in the aperture, wherein the magnetic portion defines a ridge portion of the ridge waveguide.

4. The device of claim 3, further comprising a first magnetic layer adjacent a third surface of the cross-track portion of the electrical conductor.

5. The device of claim 4, further comprising a second magnetic layer adjacent a fourth surface of the cross-track portion of the electrical conductor, wherein the third surface of the cross-track portion opposes the fourth surface.

6. The device of claim 1, further comprising means for focusing the incident optical energy onto the waveguide defined by the dielectric portion at the first surface of the cross-track portion of the electrical conductor.

7. The device of claim 6, further comprising mode selection means for selecting a mode of transmission of the incident optical energy that propagates through the means for focusing and impinges on the waveguide defined by the dielectric portion of the electrical conductor.

8. The device of claim 7, wherein the mode selection means includes an optical waveguide.

9. The device of claim 7, further comprising a source of the incident optical energy.

10. The device of claim 9, wherein the source of the incident optical energy includes a laser.

11. The device of claim 6, wherein the means for focusing energy includes a two-dimensional optical waveguide with mode index waveguide lenses.

12. The device of claim 11, wherein the mode index waveguide lenses includes an integrated solid immersion lens.

13. The device of claim 6, wherein the means for focusing energy includes a tapered waveguide.

14. The device of claim 1, wherein a first cross-sectional shape of the dielectric is not the same as a second cross-sectional shape of the dielectric.

15. The device of claim 1, further comprising a CIP read portion adjacent the electrical conductor.

16. The device of claim 1, further comprising a CPP read portion adjacent the electrical conductor.

17. A read/write head, comprising:
    a magnetoresistive sensor;
    an electrical conductor having a cross-track portion oriented in the same direction as the magnetoresistive sensor relative to a track of a recording medium, wherein the cross-track portion includes first and second opposing surfaces, and wherein the cross-track portion defines an aperture extending from the first surface to the second surface; and
    a dielectric portion disposed in the aperture such that the dielectric portion defines a waveguide having a lowest-order mode cut-off frequency that is less than the frequency of energy from an energy source that propagates through the waveguide and impinges on the recording medium.

18. The read/write head of claim 17, wherein the dielectric portion disposed in the aperture defines a ridge waveguide.

19. The read/write head of claim 18, further comprising a magnetic portion disposed in the aperture, wherein the magnetic portion defines a ridge portion of the ridge waveguide.

20. The read/write head of claim 19, wherein the magnetic portion includes a magnetic material selected from the group consisting of FeCo and NiFe.

21. The read/write head of claim 19, further comprising a first magnetic layer adjacent a third surface of the cross-track portion of the electrical conductor.

22. The read/write head of claim 21, wherein the first magnetic layer includes a magnetic material selected from the group consisting of FeCo and NiFe.

23. The read/write head of claim 21, further comprising a second magnetic layer adjacent a fourth surface of the cross-track portion of the electrical conductor, wherein the third surface of the cross-track portion opposes the fourth surface.

24. The read/write head of claim 23, wherein the first and second magnetic layers include a magnetic material selected from the group consisting of FeCo and NiFe.

25. The read/write head of claim 17, further comprising mode selection means for selecting a mode of transmission of the energy from the energy source.

26. The read/write head of claim 25, further comprising means for focusing energy from the energy source onto the dielectric portion.

27. The read/write head of claim 26, wherein the means for focusing energy from the energy source onto the dielectric portion comprises a two-dimensional optical waveguide with a mode index waveguide lens.

28. The read/write head of claim 27, wherein the mode index waveguide lenses includes an integrated solid immersion lens.

29. The read/write head of claim 26, wherein the means for focusing energy from the energy source onto the dielectric portion comprises a tapered waveguide.

30. The read/write head of claim 17, further comprising an optical waveguide for selecting a mode of transmission of the energy from the energy source.

31. The read/write head of claim 17, wherein a first cross-sectional shape of the dielectric is not the same as a second cross-sectional shape of the dielectric.

32. The read/write head of claim 17, wherein the energy source includes a laser.

33. The read/write head of claim 17, wherein the magnetoresistive sensor includes a giant magnetoresistive sensor.

34. The read/write head of claim 17, wherein the electrical conductor includes a metal selected from the group consisting of gold, copper, aluminum and silver.

35. A read/write head, comprising:
- a magnetoresistive sensor;
- an electrical conductor having a cross-track portion oriented in the same direction as the magnetoresistive sensor relative to a track of a recording medium, wherein the cross-track portion includes first and second opposing surfaces, and wherein the cross-track portion defines an aperture extending from the first surface to the second surface;
- a dielectric portion disposed in the aperture such that the dielectric portion defines a ridge waveguide having a lowest-order mode cut-off frequency that is less than the frequency of energy from an energy source that propagates through the ridge waveguide and impinges on the recording medium;
- mode selection means for selecting a mode of transmission of the energy from the energy source; and
- means for focusing energy from the energy source onto the dielectric portion.

36. The read/write head of claim 35, wherein the mode selection means includes an optical waveguide.

37. The read/write head of claim 36, wherein the means for focusing energy includes a two-dimensional optical waveguide with mode index waveguide lenses.

38. The read/write head of claim 36, wherein the means for focusing energy includes a tapered waveguide.

39. The read/write head of claim 35, further comprising a magnetic portion disposed in the aperture, wherein the magnetic portion defines a ridge portion of the ridge waveguide.

40. The read/write head of claim 39, further comprising a first magnetic layer adjacent a third surface of the cross-track portion of the electrical conductor.

41. The read/write head of claim 40, further comprising a second magnetic layer adjacent a fourth surface of the cross-track portion of the electrical conductor, wherein the third surface of the cross-track portion opposes the fourth surface.

42. A read/write head, comprising:
- a magnetoresistive sensor;
- an optical waveguide;
- an electrical conductor having a cross-track portion oriented in the same direction as the magnetoresistive sensor relative to a track of a recording medium, wherein the cross-track portion includes first and second opposing surfaces, and wherein the cross-track portion defines an aperture extending from the first surface to the second surface;
- a dielectric portion disposed in the aperture such that the dielectric portion defines a waveguide having a lowest-order mode cut-off frequency that is less than the frequency of energy received by the optical waveguide; and
- means for focusing the energy received by the optical waveguide onto the dielectric portion at the first surface of the cross-track portion of the electrical conductor.

43. The read/write head of claim 42, wherein the dielectric portion disposed in the aperture defines a ridge waveguide.

44. The read/write head of claim 43, further comprising a magnetic portion disposed in the aperture, wherein the magnetic portion defines a ridge portion of the ridge waveguide.

45. The read/write head of claim 44, wherein the magnetic portion includes a magnetic material selected from the group consisting of FeCo and NiFe.

46. The read/write head of claim 44, further comprising a first magnetic layer adjacent a third surface of the cross-track portion of the electrical conductor.

47. The read/write head of claim 46, wherein the first magnetic layer includes a magnetic material selected from the group consisting of FeCo and NiFe.

48. The read/write head of claim 46, further comprising a second magnetic layer adjacent a fourth surface of the cross-track portion of the electrical conductor, wherein the third surface of the cross-track portion opposes the fourth surface.

49. The read/write head of claim 48, wherein the first and second magnetic layers include a magnetic material selected from the group consisting of FeCo and NiFe.

50. The read/write head of claim 42, wherein the means for focusing energy includes a two-dimensional optical waveguide with mode index waveguide lenses.

51. The read/write head of claim 50, wherein the mode index waveguide lenses include an integrated solid immersion lens.

52. The read/write head of claim 42, wherein the means for focusing energy includes a tapered waveguide.

53. The read/write head of claim 42, wherein a first cross-sectional shape of the dielectric is not the same as a second cross-sectional shape of the dielectric.

54. The read/write head of claim 42, wherein the magnetoresistive sensor includes a giant magnetoresistive sensor.

55. The read/write head of claim 42, wherein the electrical conductor includes a metal selected from the group consisting of gold, copper, silver and aluminum.

* * * * *

UNITED STATES PATENT AND TRADEMARK OFFICE
CERTIFICATE OF CORRECTION

PATENT NO. : 6,999,384 B2  
APPLICATION NO. : 10/256809  
DATED : February 14, 2006  
INVENTOR(S) : Daniel D. Stancil et al.

Page 1 of 1

It is certified that error appears in the above-identified patent and that said Letters Patent is hereby corrected as shown below:

COLUMN 2

Line 63, delete "present invention." and substitute therefor --the present invention--.

COLUMN 6

Line 9, delete "larger then its" and substitute therefor --larger than its--.

COLUMN 6

Line 12, delete "larger then its" and substitute therefor --larger than its--.

COLUMN 8

Line 2, delete "$SiN_1$ bound" and substitute therefor --$SiN_x$ bound--.

Signed and Sealed this

Nineteenth Day of December, 2006

JON W. DUDAS  
*Director of the United States Patent and Trademark Office*